(12) United States Patent
Bhuwania et al.

(10) Patent No.: US 9,211,504 B2
(45) Date of Patent: Dec. 15, 2015

(54) STABILIZATION OF POROUS MORPHOLOGIES FOR HIGH PERFORMANCE CARBON MOLECULAR SIEVE HOLLOW FIBER MEMBRANES

(71) Applicants: Georgia Tech Research Corporation, Atlanta, GA (US); Shell Oil Company, Houston, TX (US)

(72) Inventors: Nitesh Bhuwania, Atlanta, GA (US); William John Koros, Atlanta, GA (US); Paul Jason Williams, Richmond, TX (US)

(73) Assignees: GEORGIA TECH RESEARCH CORPORATION, Atlanta, GA (US); SHELL OIL COMPANY, Houston, TX (US)

( * ) Notice: Subject to any disclaimer, the term of this patent is extended or adjusted under 35 U.S.C. 154(b) by 153 days.

(21) Appl. No.: 13/666,370

(22) Filed: Nov. 1, 2012

(65) Prior Publication Data
US 2013/0152793 A1  Jun. 20, 2013

Related U.S. Application Data

(60) Provisional application No. 61/577,949, filed on Dec. 20, 2011.

(51) Int. Cl.
*B01D 53/22* (2006.01)
*B01D 67/00* (2006.01)
(Continued)

(52) U.S. Cl.
CPC .......... *B01D 67/0076* (2013.01); *B01D 53/228* (2013.01); *B01D 67/0067* (2013.01); *B01D 69/08* (2013.01); *B01D 71/021* (2013.01); *B01D 2325/022* (2013.01); *B01D 2325/20* (2013.01)

(58) Field of Classification Search
CPC ............. B01D 53/228; B01D 67/0067; B01D 67/0076; B01D 69/08; B01D 71/021; B01D 2325/022; B01D 2325/20
USPC ...................... 95/43, 45, 51; 96/4, 7, 8, 10, 14
See application file for complete search history.

(56) References Cited

U.S. PATENT DOCUMENTS 4,919,860 A * 4/1990 Schindler et al. ............ 264/29.1
4,950,314 A   8/1990 Yamada et al.
(Continued)

OTHER PUBLICATIONS

International Search Report and Written Opinion dated Feb. 28, 2013 for related PCT Application No. PCT/US2012/062440.

*Primary Examiner* — Jason M Greene
*Assistant Examiner* — Anthony Shumate
(74) *Attorney, Agent, or Firm* — McAndrews, Held & Malloy, Ltd.

(57) ABSTRACT

Carbon molecular sieves (CMS) membranes having improved thermal and/or mechanical properties are disclosed herein. In one embodiment, a carbon molecular sieve membrane for separating a first and one or more second gases from a feed mixture of the first gas and one or more second gases comprises a hollow filamentary carbon core and a thermally stabilized polymer precursor disposed on at least an outer portion of the core. In some embodiments, the thermally stabilized polymer precursor is created by the process of placing in a reaction vessel the carbon molecular sieve membrane comprising an unmodified aromatic imide polymer, filling the reaction vessel with a modifying agent, and changing the temperature of the reaction vessel at a temperature ramp up rate and ramp down rate for a period of time so that the modifying agent alters the unmodified aromatic imide polymer to form a thermally stabilized polymer precursor.

31 Claims, 13 Drawing Sheets

(51) Int. Cl.
    *B01D 69/08*     (2006.01)
    *B01D 71/02*     (2006.01)

(56) References Cited

U.S. PATENT DOCUMENTS

| | | | | |
|---|---|---|---|---|
| 6,719,147 | B2 * | 4/2004 | Strano et al. | 210/490 |
| 7,393,383 | B2 * | 7/2008 | Ekiner et al. | 95/45 |
| 7,404,844 | B2 * | 7/2008 | Tin et al. | 95/45 |
| 7,891,499 | B2 * | 2/2011 | Ichikawa et al. | 210/490 |
| 8,318,377 | B2 * | 11/2012 | Miyami et al. | 429/492 |
| 8,608,828 | B2 * | 12/2013 | Voss et al. | 95/45 |
| 8,912,288 | B2 * | 12/2014 | Liu et al. | 525/310 |
| 2003/0185998 | A1 | 10/2003 | Hong et al. | |
| 2003/0221559 | A1 | 12/2003 | Koros et al. | |
| 2005/0235825 | A1 | 10/2005 | Tin et al. | |
| 2009/0242478 | A1 * | 10/2009 | Ichikawa et al. | 210/500.33 |
| 2009/0282802 | A1 * | 11/2009 | Cooper et al. | 57/238 |
| 2010/0047659 | A1 * | 2/2010 | Miyama et al. | 429/33 |
| 2010/0099804 | A1 * | 4/2010 | Lee et al. | 524/261 |
| 2011/0100211 | A1 * | 5/2011 | Kiyono et al. | 95/45 |
| 2012/0079944 | A1 * | 4/2012 | Vo et al. | 96/11 |
| 2013/0152793 | A1 * | 6/2013 | Bhuwania et al. | 96/4 |
| 2014/0000454 | A1 * | 1/2014 | Singh et al. | 95/50 |
| 2015/0053079 | A1 * | 2/2015 | Koros et al. | 95/50 |

\* cited by examiner

Unmodified Matrimid®

Chemically Modified Matrimid®

STABILIZATION OF POROUS MORPHOLOGIES FOR HIGH PERFORMANCE CARBON MOLECULAR SIEVE HOLLOW FIBER MEMBRANES

CROSS REFERENCE TO RELATED APPLICATION

This application claims benefit of US Provisional Patent Application Ser. No. 61/577,949 filed 20 Dec. 2011, entitled, "Stabilization of Porous Morphologies for high Performance Carbon Molecular Sieves (CMS) Hollow Fiber Membranes and Sorbents Derived from Chemically Modified Polymers," which application is hereby incorporated fully by reference.

BACKGROUND OF THE INVENTION

1. Field of the Invention

The present invention relates generally to carbon molecular sieve (CMS) membranes, and more particularly to CMS membranes formed by stabilizing the precursors before they experience pyrolysis to provide improved permeance and selectivity equivalent to or higher than the precursor.

2. Description of the Related Art

Carbon molecular sieve membranes have shown great potential for carbon dioxide ($CO_2$) removal from natural gas streams. In gas separation or membrane applications, a carbon molecular sieve can include a sieve that is comprised of at least ninety percent (90%) atomic weight carbon, with the remainder as various other components. CMS membranes can be formed from the thermal pyrolysis of polymer precursors.

The performance of polymer membranes can be tailored somewhat; however, the separation performance of these polymeric membrane materials has stagnated at a so-called "polymer upper bound trade-off line" related to $CO_2$ permeability and $CO_2/CH_4$ selectivity. This trade-off can result in undesirably high methane loss along with the $CO_2$ in the permeate stream.

$CO_2$ permeability is a convenient measure of productivity equal to the flux of $CO_2$, which has been normalized by the thickness of the dense selective layer and the $CO_2$ partial pressure difference acting across this layer. The units of permeability are usually reported in "Barrers", where 1 Barrer=$10^{-10}$ [cc(STP)cm]/[cm$^2$·sec·cmHg]. The membrane selectivity is ideally independent of the thickness of the dense layer, and equals the ratio of the permeability of $CO_2$ to $CH_4$ for desirable cases where the ratio of upstream to downstream total pressure is much greater than the permeability ratio of $CO_2$ to $CH_4$.

CMS membranes possess the ability to cross over the upper bound for dense film configurations. It is possible, using conventional CMS dense film membranes, to have $CO_2$ permeabilities vs methane permeabilities as high as ~75 for pure gas at 50 psia upstream and at 35° C. Some CMS membranes in hollow fiber configuration can separate $CO_2$ from 50% $CO_2$ mixed gas methane stream with selectivities of ~90 for upstream pressures up to 1168 psia and at 35° C.

Though CMS hollow fiber membranes show encouraging selectivities, they show lower productivity after pyrolysis than would be expected based on the productivity increase in corresponding dense films before and after pyrolysis of the same precursor polymer. The unit of productivity for an asymmetric membrane does not contain a thickness normalizing factor, so the flux is only normalized by dividing by the partial pressure difference acting between the upstream and downstream across the membrane: 1 GPU=$10^{-6}$ cc(STP)/[cm$^2$·sec·cmHg].

There are several parameters that can influence the performance of CMS membranes, including, but not limited to: (i) the polymer precursor used; (ii) precursor pre-treatment before pyrolysis; (iii) the pyrolysis process, e.g. final heating temperature or pyrolysis atmosphere; and (iv) post-treatment of CMS membranes after pyrolysis.

Detailed investigations have been performed on CMS dense film membranes using conventional polyimide precursors such as, by way of example and not limitation, Matrimid® 5218 and 6FDA:BPDA-DAM. The chemical structures for both the polyimide precursors are illustrated in FIG. 1a for thermoplastic polyimide based on a specialty diamine, 5(6)-amino-1-(4' aminophenyl)-1,3,-trimethylindane (Matrimid®) and 1b for 2,4,6-Trimethyl-1,3-phenylene diamine (DAM), 3,3,4,4-biphenyl tetracarboxylic dianhydride (BPDA), and 5,5-[2,2,2-trifluoro-1-(trifluoromethyl)ethylidene]bis-1,3-isobenzofurandione (6FDA) commonly referred as 6FDA:BPDA-DAM. Matrimid® 5218 is a soluble thermoplastic polyimide fully imidized during manufacturing, eliminating the need for high temperature processing, and is soluble in a variety of common solvents.

It has been shown that by tuning the pyrolysis process parameters, e.g., final heating temperature, it is possible to modify the resulting CMS membrane performance and achieve greater performance than both these precursors. Other studies have looked at the effect of pyrolysis environments on CMS dense film membranes and related membrane separation performance with different atmospheres containing varied levels of oxygen. The studies introduced the concept of "oxygen doping" on CMS membranes during the pyrolysis, as shown by way of example in US Patent Publication No. 2011/0100211 A1, the contents of which are hereby incorporated by reference.

U.S. Pat. No. 6,565,631 to Koros et al. (Koros), the contents of which are hereby incorporated by reference, extended the CMS dense film to industrially relevant hollow fiber configurations. Koros showed the synthesis of these membranes and evaluated their performance under high feed pressures and impurities. The membranes as taught by Koros are shown to be resistant under extreme conditions without significant degradation in performance. The membranes of Koros, CMS hollow fibers using 6FDA:BPDA-DAM precursors, showed $CO_2$ permeance of ~30 Gas Permeation Unit (GPU) with selectivities of 55 for $CO_2/CH_4$ upstream pressures up to 1000 psia and at 35° C. from mixed gas methane stream containing 10% $CO_2$. Under the same testing conditions for Matrimid® precursor based CMS membranes, the membranes of Koros saw higher selectivities ~85 for upstream pressures up to 200 psia and at 35° C. but with some decreased permeance of ~12 GPU.

Low permeances are concerns for the industrial use of CMS hollow fiber membranes. Researchers in this area have tried to address this problem by relating it to the substructure morphology collapse, as shown in FIGS. 2a and 2b for a Matrimid®-based precursor. For the purposes of the present invention, we define substructure collapse as shown in the Equation $$\left(\frac{\text{thickness}(CMS \text{ fiber wall})}{\text{thickness (precursor fiber wall)}}\right) < 0.8 * \left(\frac{\text{thickness }(CMS \text{ dense film})}{\text{thickness (precursor dense film)}}\right),$$

to be the situation in which the thickness ratio for the fiber wall after and before pyrolysis is less than 0.8 of the ratio of the thickness for a dense film after and before pyrolysis. Even for robust higher glass transition temperatures ($T_g$) polymer precursors such as 6FDA:BPDA-DAM, the sub-structure collapse is observed upon pyrolysis but to a lesser extent in comparison to Matrimid® precursors, shown in FIGS. 3a and 3b.

The intensive heat-treatment during pyrolysis (above $T_g$) relaxes the polymer chains, causing their segments to move closer to each other, increasing the actual membrane separation thickness in asymmetric CMS hollow fibers. This increased separation thickness is believed to be the primary cause for the major permeance drop, which is defined as permeability/actual separation thickness. Although CMS dense film membrane permeability is high, due to the morphology collapse during pyrolysis, a conventional CMS hollow fiber membrane experiences a permeance drop because of increased effective membrane thickness.

Asymmetric hollow fiber membranes comprise an ultrathin dense skin layer supported by a porous substructure. Asymmetric hollow fiber membranes can be formed via a dry-jet/wet quench spinning process illustrated in FIG. 4a. The polymer solution used for spinning is referred to as "dope". Dope composition can be described in terms of a ternary phase diagram as shown in FIG. 4b.

Polymer molecular weight and concentration are closely correlated to viscosity and the mass transfer coefficient of the dope which affects the overall morphology of hollow fibers. The ratio of solvents to that of non-solvents should be adjusted in order to keep the dope in the 1-phase region close to the binodal. The amount of volatile component in the dope is a key factor for successful skin layer formation.

The dense skin layer is formed by evaporation of volatile solvents which drives the dope composition toward the vitrified region (indicated by dashed line indicated by the "Skin Layer Formation" arrow in FIG. 4b). The porous substructure is formed when the dope phase separates in the quench bath and enters into a 2-phase region (indicated by dashed line indicated by the "Substructure Formation" arrow in FIG. 4b).

In this way, a desirable asymmetric morphology comprising a dense selective skin layer with a porous support structure is formed. In the process of FIG. 4a, the dope and bore fluid are coextruded through a spinneret into an air gap ("dry-jet"), where a dense skin layer is formed and then immersed into an aqueous quench bath ("wet-quench"), where the dope phase separates to form a porous substructure and can support the dense skin layer. After phase separation in the quench bath, vitrified fibers are collected by a take-up drum and kept for solvent exchange. The solvent exchange technique can play a critical role in maintaining the pores formed in the asymmetric hollow fiber Thus, during the process of fiber spinning, as shown in FIG. 4a, sub-structure pores are formed by the exchange of solvent molecules in a dope solution with non-solvent water molecules in a quench bath during a phase separation process of the polymer from the dope solution. The pores formed do not allow a uniform well-packed distribution of polymer chains for the asymmetric hollow fiber morphology. Hence, this expanded distribution of polymer chains in the precursor fiber can be considered as a thermodynamically unstable state, promoting the tendency for the sub-structure morphology collapse in CMS hollow fibers when sufficient segmental mobility exists before pyrolysis is complete. In this case, during pyrolysis, the porous morphology of the precursor fiber turns into a thick dense collapsed layer. This change in the membrane morphology is seen to start at the glass transition temperature ($T_g$) of the polymer precursor. Under heat treatment above $T_g$, the un-oriented polymer chains enter into a soft and viscous zone which increases the chains mobility enabling them to move closer to each other. This heat treatment increases the chain packing density, resulting in the sub-structure collapse. The relaxation of the polymer precursor chains under the strong heat treatment is a primary cause for pore collapse.

Studies on the mechanism of sub-structure collapse at $T_g$ for CMS fibers, such as Matrimid® CMS hollow fibers, and some methods to try to compensate for the membrane collapse issue have been performed in the past. For example, in order to test the hypothesis of sub-structure collapse at $T_g$, permeance and SEM characterization were performed shown in FIGS. 5a and 5b. The asymmetric Matrimid® precursor fiber was heated up to 320° C. ($T_g$ of Matrimid ~315° C.) with 10 minutes of thermal soak time under vacuum atmosphere (~1 mtorr). The same fiber after heat-treatment at $T_g$ is pyrolyzed using the standard pyrolysis temperature protocol, FIG. 5a, under the same vacuum atmosphere.

FIG. 5b illustrates the permeance drop experienced in CMS asymmetric hollow fiber membranes due to the sub-structure collapse occurring at $T_g$, tested at 100 psia and 35° C. As shown in FIG. 5b, the $CO_2$ permeance of Matrimid® fiber heat-treated at $T_g$ (solid square) suffers a significant permeance drop when compared to the precursor (solid diamond) and CMS hollow fiber permeance (solid triangle). Even a short soak time of ~10 minutes at $T_g$ is sufficient for the permeance to drop down to the maximum possible extent (0.13 GPU), which is essentially equivalent to the thickness normalized precursor dense film productivity (0.2 GPU—solid point). Because of the permeance drop, the advantage of having a high transport flux in an asymmetric precursor fiber is lost significantly or completely and the fiber can be treated as a precursor dense film with similar thickness.

The significant permeance drop of the precursor fiber at $T_g$ indicates that the morphology of CMS fiber is essentially completely collapsed at $T_g$. The increase in CMS permeance (solid triangle) over the collapsed fiber is due to decomposition of volatile compounds during pyrolysis. For the collapse of CMS fibers, an important temperature zone is between the glass transition $T_g$ and decomposition $T_d$. Once the temperature crosses $T_g$ and enters the rubbery region the amorphous rubbery polymer can flow, but the sieving structure does not form until the polymer begins to decompose. Therefore, minimizing the time the CMS fibers experience temperatures between these zones without introducing defects usually provides the best way to prevent or reduce permeance loss while maintaining good separation ability. But, in practice it is observed that heating at extremely fast rates leads to the creation of defects, which reduces the separation ability. Therefore, an optimum heating rate must be determined experimentally.

FIG. 6a is a SEM image of Matrimid® fiber after heat treatment at $T_g$, depicting the collapse morphology observed in the final CMS fibers obtained from the same precursor fiber morphology as shown in FIG. 6b.

Conventional techniques that have been attempted to reduce or eliminate substructure collapse for polymer precursors, such as Matrimid® precursor, include, but are not limited to: puffing the porous support of polymer precursor with "puffing agents"; thermally stabilizing the fiber below the glass transition temperature $T_g$; and crosslinking the polymer chain in order to avoid densification.

Possible "puffing agents" are species which can decompose into large volatile byproducts upon heating and leave void volume in the carbon after decomposition. One such puffing technique includes the use of polyethylene glycol (PEG). PEG can have an "unzipping effect" upon heating at higher temperatures. Essentially all of the PEG molecules can be seen to unzip at ceiling temperatures of ~350° C. By puffing PEG in the pores before pyrolysis, it was attempted to prevent the collapse near the Matrimid® $T_g$ (~315° C.). The comparison of both the TGA curves for Matrimid® and PEG (Mol wt: 3400) is shown in FIG. 7.

An advantage of using PEG is that it is soluble in water and is readily absorbed in the pores in an economical post fiber spinning step. Nevertheless, substructure collapse was seen to still occur even after PEG puffing upon pyrolysis. Without being held to any particular theory of operation, it is believed that the reason why PEG puffing does not appreciably impact sub-structure collapse is due to the wide temperature range of collapse, e.g. from $T_g$~315° C. to decomposition point ~425° C. PEG puffing is presumably not successful in stabilizing the pores, as collapse starts before the unzipping temperature of the PEG.

Pre-pyrolysis thermal stabilization of polymer precursors has also been attempted using conventional methods in both oxidative and non-oxidative atmospheres. In preliminary work, fibers were pre-heated in a furnace at 270° C., which is below the $T_g$, for time duration of 48 hours for pre-stabilization. After heat treatment, pyrolysis was performed using a standard protocol. Testing showed that the temperature stabilization of the pores did not make any significant impact on collapse for Matrimid®.

Another conventional method attempted is to crosslink the polymer precursor prior to pyrolysis. For example, researchers attempting to solve other issues have in the past attempted to crosslink precursors such as Matrimid® using UV radiation and diamine cross linkers. Such conventional crosslinking techniques using diamine linkers for Matrimid® based precursors have proven to be unsuccessful. As shown in the SEM images FIGS. 8a and 8b, the collapse is still observed in resultant CMS from diamine-crosslinked Matrimid® precursor fiber. Studies have indicated the diamine crosslinking to be reversible when heated at higher temperatures.

In addition to substructure collapse problems, a second challenge to CMS scale up for commercial viability is producing a large amount of CMS in a single pyrolysis run. One option in overcoming scale up problems is to pyrolyze the polymer precursor fibers in bundles but still obtain individual CMS fibers with the same or similar separation performance as non-bundled. Using conventional techniques, when pyrolyzed in bundles, polymer precursor flow can not only cause substructure collapse, but can also cause the fibers to "stick" together. When using unmodified precursor fibers according to conventional techniques, it is often necessary to separate the fibers from touching (or sticking) to each other during pyrolysis.

Thus, there is an unmet need in the art for thermally stabilized polymer precursors and asymmetric CMS hollow fiber membranes.

BRIEF SUMMARY OF THE INVENTION

Briefly described, in an exemplary form, the present invention limits or prevents the sub-structure collapse that conventionally occurs during the thermal transition of a polymer at the glass transition temperature ($T_g$) by stabilizing the polymer precursor before it experiences the thermal transition. The resulting polymers provide superior CMS membranes that show enhanced gas separation capability. In an exemplary embodiment, the CMS fibers are hollow fibers having exceptional separation efficiency while avoiding product adherence and reducing or eliminating the conventional drop in transport flux caused by sub-structure collapse and densification of the porous morphology when the polymer precursor is not stabilized prior to pyrolysis.

An exemplary polymer permits passage of the desired gases to be separated, for example carbon dioxide and methane. Preferably, the polymer permits one or more of the desired gases to permeate through the polymer at different diffusion rates than other components, such that one of the individual gases, for example carbon dioxide, diffuses at a faster rate than methane through the polymer.

For use in making carbon molecular sieve membranes for separating $CO_2$ and $CH_4$, the most preferred polymers include the polyimides Ultem® 1000, Matrimid® 5218, 6FDA/BPDA-DAM, 6FDA-6FpDA, and 6FDA-IPDA.

Examples of other exemplary polymers include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly (ethylene), poly (propylene), poly(butene-1), poly(4-methyl pentene-1), polyvinyls, e.g., polyvinyl chloride, poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like. It is preferred that the membranes exhibit a carbon dioxide/methane selectivity of at least about 10, more preferably at least about 20, and most preferably at least about 30.

Preferably, the polymer is a rigid, glassy polymer as opposed to a rubbery polymer or a flexible glassy polymer. Glassy polymers are differentiated from rubbery polymers by the rate of segmental movement of polymer chains. Polymers in the glassy state do not have the rapid molecular motions that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. As discussed, the glass transition temperature ($T_g$) is the dividing point between the rubbery or glassy state. Above the $T_g$, the polymer exists in the rubbery state; below the $T_g$, the polymer exists in the glassy state. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures ($T_g$>150° C.).

In rigid, glassy polymers, the diffusion coefficient tends to control selectivity, and glassy membranes tend to be selective in favor of small, low-boiling molecules. The preferred membranes are made from rigid, glassy polymer materials that will pass carbon dioxide, hydrogen sulfide and nitrogen preferentially over methane and other light hydrocarbons. Such polymers are well known in the art and include polyimides, polysulfones and cellulosic polymers.

The present invention can comprise a modified polymer precursor for use in the production of asymmetric hollow fiber CMS membranes for gas separation. Embodiments of the current invention are directed at the production of CMS membranes for the separation of $CO_2$ and $H_2S$ from hydrocarbon containing streams. In other embodiments, CMS membranes could be used for the separation of nitrogen from natural gas, the separation of oxygen from air, the separation of hydrogen from hydrocarbons, and the separation of olefins from paraffins of similar carbon number. Embodiments of the present invention are directed to stabilizing polymer precursors, preferably to maintain or improve CMS membrane performance after pyrolysis. The present invention, in various embodiments, is an asymmetric carbon molecular sieve membrane formed from a polymer precursor modified using a modifying agent. In some embodiments, the modifying agent can be a silane optionally substituted with a vinyl and/or an alkoxy group. In an embodiment, the modifying agent can be a vinyl alkoxy silane, or a vinyl trialkoxy silane. In an embodiment, vinyl triethoxy silane or vinyl trimethoxy silane (VTMS), particularly VTMS, can be used as the modifying agents for chemical precursor treatment. In some further embodiments, a precursor is at least partially thermally and/or physically stabilized by exposing VTMS to the precursor.

In one exemplary embodiment, the invention is a process for modifying a polymer precursor for use as a substantially non-collapsed, asymmetrical carbon membrane comprising the steps of providing the polymer precursor in a contacting vessel, providing a modifying agent in the contacting vessel, and allowing at least a portion of the polymer precursor to contact at least a portion of the modifying agent in the contacting vessel to provide for the modification of at least a portion of the polymer precursor to create a modified polymer precursor that when pyrolyzed creates a substantially non-collapsed, asymmetrical carbon membrane. In some embodiments, the polymer precursor includes a polymer selected from the group consisting of Matrimid® and 6FDA:BPDA-DAM and the modifying agent is vinyl trimethoxy silane.

In further embodiments, the step of modifying the polymer precursor with modifying agent in the contacting vessel comprises heating the contacting vessel to raise the temperature of contents in the contacting vessel within a reaction temperature range for a period of time. In some additional embodiments, the reaction temperature range wherein the reaction temperature range is selected from the group consisting of: from approximately 25° C. to approximately the polymer precursor glass transition temperature; from approximately 100° C. to approximately the polymer precursor glass transition temperature; and from approximately 100° C. to approximately 250° C.

In some embodiments, the period of time is from approximately 30 minutes to approximately 24 hours.

In some embodiments, the polymer precursor is an asymmetric hollow polymer fiber, wherein, in still further embodiments, the polymer precursor is an aromatic imide polymer precursor fiber.

In additional embodiments, the process further comprises pyrolyzing the modified polymer precursor by heating the polymer precursor in a pyrolysis chamber to at least a temperature at which pyrolysis byproducts are evolved. In further embodiments, the process further comprises flowing an inert gas through the pyrolysis chamber during said heating step. In additional embodiments, the pyrolysis chamber and the contacting vessel are the same.

In further embodiments, the modified polymer precursor is a composite structure comprising a first polymer supported on a porous second polymer support. In still further embodiments, the polymer precursor is a material that can be pyrolyzed to form CMS membrane, but whose asymmetric structure does not collapse during pyrolysis.

In another embodiment, the present invention is a modified polymer precursor for a substantially non-collapsed, asymmetrical carbon membrane created by the steps of providing the polymer precursor in a contacting vessel, providing a modifying agent in the contacting vessel, and allowing at least a portion of the polymer precursor to contact at least a portion of the modifying agent in the contacting vessel to provide for the modification of at least a portion of the polymer precursor to create a modified polymer precursor that when pyrolyzed creates an asymmetrical carbon membrane.

In a still further embodiment, the present invention is a process for reducing adhesion between a plurality of modified polymer precursors for as a substantially non-collapsed, asymmetrical carbon membrane, comprising the steps of providing the plurality of polymer precursors in a contacting vessel, providing a modifying agent in the contacting vessel, allowing at least a portion of the plurality of polymer precursors to contact at least a portion of the modifying agent in the contacting vessel to provide for the modification of at least a portion of the plurality of polymer precursors to create the plurality of modified polymer precursors that when pyrolyzed create a plurality of substantially non-collapsed, asymmetrical carbon membranes, and wherein at least a portion of the plurality of modified polymer precursors do not adhere to each other.

In another exemplary embodiment, the present invention is a process for forming a carbon membrane using precursor pre-treatment comprising providing a polymer precursor, pre-treating at least a portion of the polymer precursor, and subjecting the pre-treated polymer precursor to pyrolysis, wherein the step of pre-treating at least a portion of the polymer precursor provides at least a 300% increase in the gas permeance of the asymmetric carbon membrane in contrast to the carbon membrane without precursor pre-treatment.

The step of pre-treating at least a portion of the polymer precursor can provide at least a 400% increase in the gas permeance of the asymmetric carbon membrane in contrast to the carbon membrane without precursor pre-treatment.

The step of pre-treating at least a portion of the polymer precursor can provide an increase in the gas separation selectivity of the carbon membrane in contrast to the carbon membrane without precursor pre-treatment.

The polymer precursor can comprise a soluble thermoplastic polyimide. The polymer precursor can comprise an asymmetric hollow polymer fiber. The polymer precursor can comprises an aromatic imide polymer precursor.

The step of pre-treating at least a portion of the polymer precursor can comprise chemically modifying the polymer precursor.

In another exemplary embodiment, in a process of forming a carbon membrane from a polymer precursor including the steps of providing a polymer precursor and subjecting the polymer precursor to pyrolysis, wherein the carbon membrane has a first gas permeance and a first gas separation selectivity, the present invention comprises the improvement of the step of pre-treating at least a portion of the polymer precursor prior to pyrolysis such that after pre-treatment and pyrolysis, the improved carbon membrane has a second gas permeance and a second gas separation selectivity, wherein at least one of the second gas permeance or second gas separation selectivity is greater than the respective first gas permeance or first gas separation selectivity.

In another exemplary embodiment, the present invention is a process for modifying a polymer precursor for use as a carbon membrane comprising providing a polymer precursor in a vessel, providing a modifying agent in the vessel, contacting at least a portion of the modifying agent with the polymer precursor in the vessel to provide for the modification of at least a portion of the polymer precursor, and subjecting the modified polymer precursor to pyrolysis forming the carbon membrane.

The carbon membrane can comprise a hollow fiber membrane, a hollow fiber membrane comprising an asymmetric membrane, and/or a substantially non-collapsed, asymmetric hollow fiber membrane.

The modifying agent can be vinyl trimethoxy silane or vinyl triethoxy silane, preferably vinyl trimethoxy silane.

The process can further comprise providing an initiator in the vessel, and/or flowing an inert gas during pyrolysis.

The polymer precursor can be a composite structure comprising a first polymer supported on a porous second polymer. An asymmetric hollow fiber membrane can comprise a group of membrane fibers that are in contact with one another during the pyrolysis process and do not adhere to one another after pyrolysis.

In another exemplary embodiment, the present invention is a process for making a carbon membrane comprising providing a polymer precursor comprising a soluble thermoplastic polyimide, chemically modifying the polymer precursor with a modifying agent, and heating the chemically modified precursor in a chamber to at least a temperature at which pyrolysis byproducts are evolved, wherein the carbon membrane has a $CO_2$ permeance (GPU) of greater than 10 and a $CO_2/CH_4$ selectivity greater than 88 when tested in pure $CO_2$ and $CH_4$ gas streams at 100 psia at 35° C. The modifying agent can comprise vinyl trimethoxy silane.

In another exemplary embodiment, the present invention is a process for making a carbon membrane comprising providing a polymer precursor comprising a soluble thermoplastic polyimide, chemically modifying the polymer precursor with a modifying agent, and heating the chemically modified precursor in a chamber to at least a temperature at which pyrolysis byproducts are evolved, wherein the carbon membrane has a $CO_2$ permeance (GPU) of greater than 53 and a $CO_2/CH_4$ selectivity greater than 48 when tested in pure $CO_2$ and $CH_4$ gas streams at 100 psia at 35° C.

In another exemplary embodiment, the present invention is a carbon molecular sieve membrane formed by one of the processes disclosed above These and other objects, features, and advantages of the present invention will become more apparent upon reading the following specification in conjunction with the accompanying drawing figures.

BRIEF DESCRIPTION OF THE FIGURES

FIG. 4b is a ternary phase diagram showing the asymmetric membrane formation process of FIG. 4a.

DETAILED DESCRIPTION OF PREFERRED EMBODIMENTS

Figure 1A:
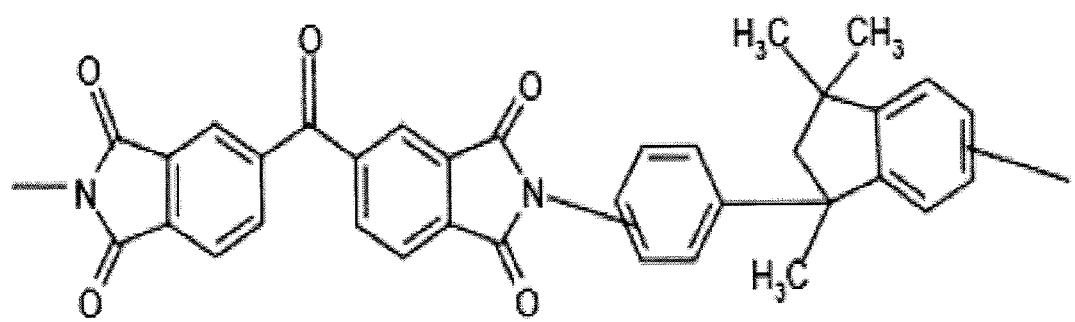
FIG. 1a is an illustration of the chemical structure for Matrimid®.
Figure 1B:
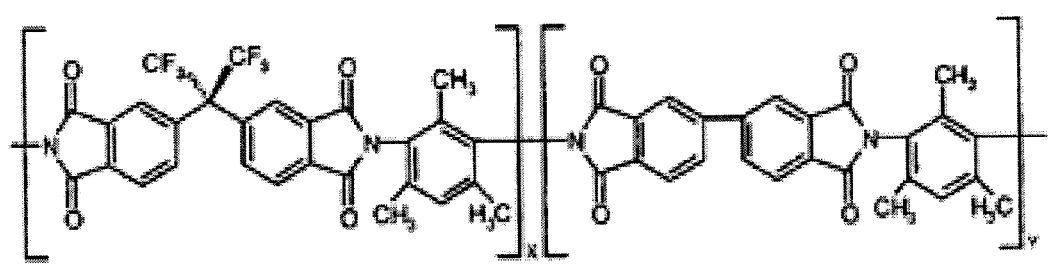
FIG. 1b is an illustration of the chemical structure for 6FDA:BPDA-DAM.
Figure 2A:
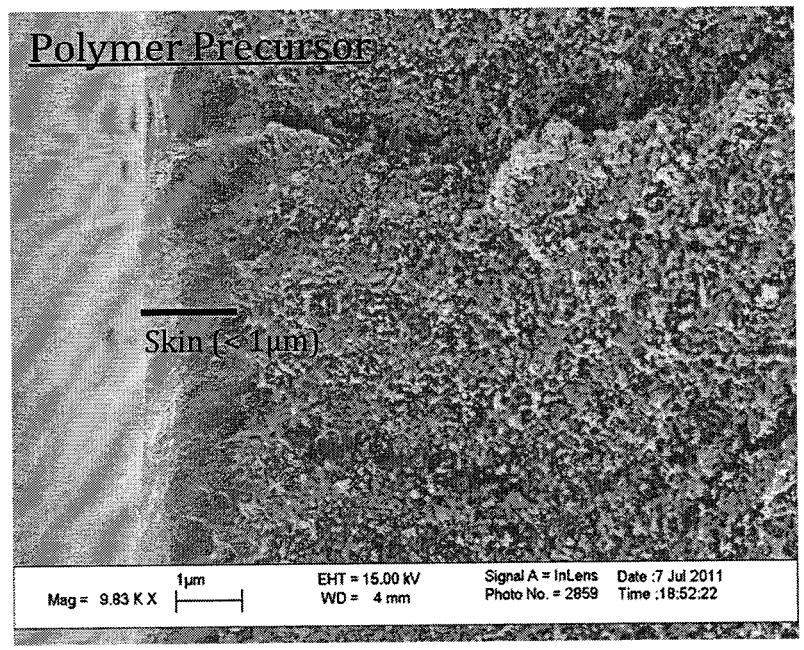
FIG. 2a is a scanning electron microscopy (SEM) image of a Matrimid® based precursor membrane.
Figure 2B:
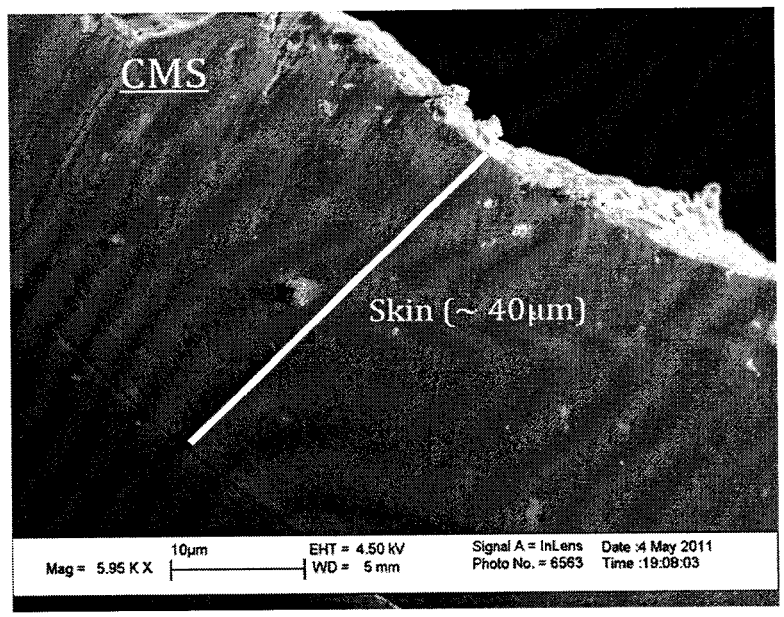
FIG. 2b is an SEM image of CMS membrane skin with morphology collapse from a Matrimid® precursor.
Figure 3A:
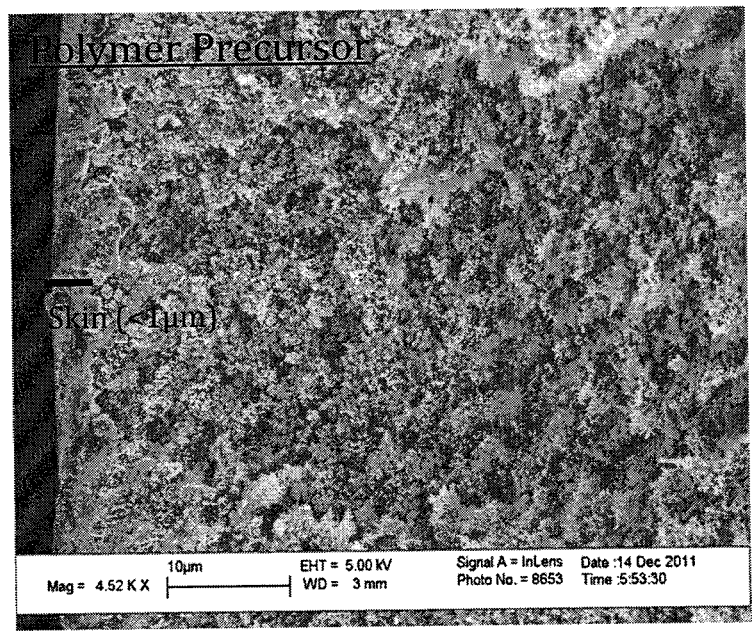
FIG. 3a is an SEM image of a 6FDA/BPDA-DAM based precursor membrane.
Figure 3B:
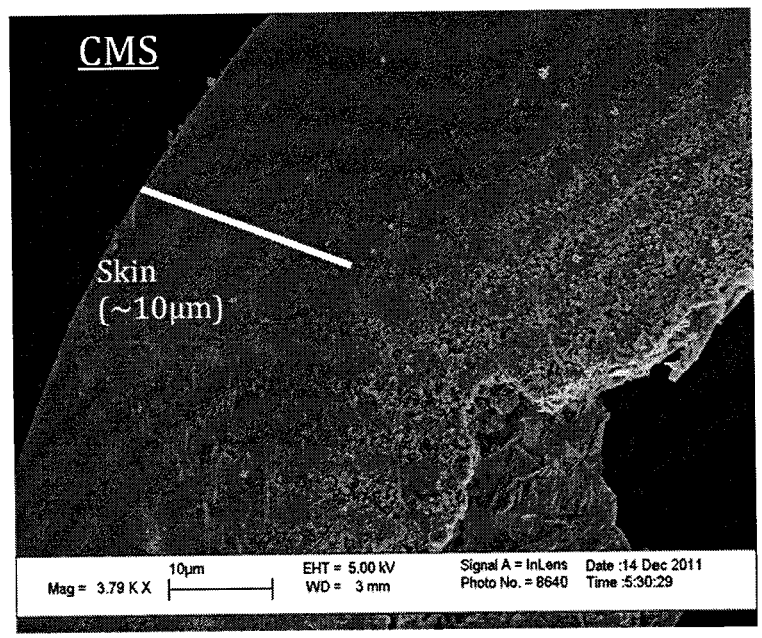
FIG. 3b is an SEM image of CMS membrane skin with morphology collapse from a 6FDA/BPDA-DAM precursor.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Various embodiments of the present invention are directed to stabilizing polymer precursors, preferably to maintain or improve CMS membrane performance after pyrolysis. The present invention described hereinafter is described in terms of "carbon" for purposes of clarification. It should be noted, however, that the scope of the present invention is not limited to "carbon" molecular sieve membrane, as other "non-carbon" membranes may be produced using various embodiments of the present invention. Various embodiments of the present invention use an improved technique of modifying CMS membranes and polymer precursors to CMS membranes.

As discussed above, various aspects of this disclosure are directed to modification of a polymer precursor to produce a modified polymer precursor. The modified polymer precursor can then be pyrolyzed to produce the CMS fiber. As used herein, "polymer precursor" is intended to encompass the asymmetric hollow fiber prepared using one of the exemplary polymers discussed previously. The polymer precursor can be prepared according to the dry-jet/wet quench spinning process described previously. However, other processes that might produce an asymmetric hollow fiber can also be used. "Polymer precursor" as used herein might also be described as a fiber precursor, or simply precursor, or the generic or trade name polymer precursor. For example, Matrimid® precursor, Matrimid® precursor fiber, and asymmetric Matrimid® precursor fiber are all intended to describe a polymer precursor based on the Matrimid® polymer 5(6)-amino-1-4'-aminophenyl-1,3-trimethylindane. Similarly, a modified polymer precursor can be a polymer precursor that has been modified with a modifying agent, and may be similarly designated modified precursor, modified fiber precursor, modified Matrimid® precursor, and so forth.

The disclosure, in various embodiments, is an asymmetric carbon molecular sieve membrane formed from a polymer precursor modified using a modifying agent. The modifying agent can also be referred to herein as a chemical modifying agent, and the process of modifying can also be referred to as chemically modifying. In some embodiments, vinyl trimethoxy silane is used as the modifying agent for chemical precursor treatment, but other silanes can also be employed as a modifying agent. In general, the silane for use in this disclosure can be described by a formula $R^1R^2R^3R^4Si$, where each of $R^1$, $R^2$, $R^3$, and $R^4$ are independently vinyl, $C_1$-$C_6$ alkyl, —O-alkyl, or halide, with the proviso that the silane contain at least one vinyl group and at least one —O-alkyl or halide. The O-alkyl can be any $C_1$ to $C_6$ alkyloxy (or alkoxy) group, including, for example, methoxyl, ethoxy, propoxy, butoxy and so forth, preferably methoxy or ethoxy. Without wishing to be bound by theory, the modifying agent is thought to be a compound that can generate an Si—O—Si linkage during modification of the polymer precursor. Therefore, the modifying agent can be a monosilane, such as for example, vinyl trimethoxysilane, vinyl triethoxysilane, vinyl dimethoxychlorosilane, vinyl diethoxychlorosilane, vinyl methoxydichlorosilane, vinyl ethoxydichlorosilane, or vinyl trichlorosilane. The modifying agent could also be a short chain oligosiloxane, where one or more of the $R^1R^2R^3R^4$ is an —O-silyl having similar substitution to the monosilane, for example, a disiloxane or trisiloxane having at least one vinyl and at least one alkoxy or halide on the oligosilane such as vinyl pentamethoxydisiloxane or divinyl tetramethoxydisiloxane. Preferably the modifying agent can be a vinyl trimethoxysilane or a vinyl triethoxy silane.

In some further embodiments, a precursor polymer is at least partially thermally and/or physically stabilized by exposing vinyl trimethoxysilane (VTMS) to the precursor. It should be understood that, although various embodiments of the present invention are discussed using vinyl trimethoxy silane and various precursors, the present invention is not limited to the use of vinyl trimethoxy silane or the precursors discussed. Other pretreatment chemicals and other precursors suitable for the purposes of various embodiments of the present invention having similar chemical and mechanical characteristics are considered to be within the scope of the present invention.

In some embodiments, the modification of the precursor with VTMS is performed by adding VTMS and precursor fibers in a contacting device for different time durations. Further, in some embodiments, the precursor and modification agent are heated in a reaction vessel under auto thermal pressure prior to the actual pyrolysis step.

Figure 9:
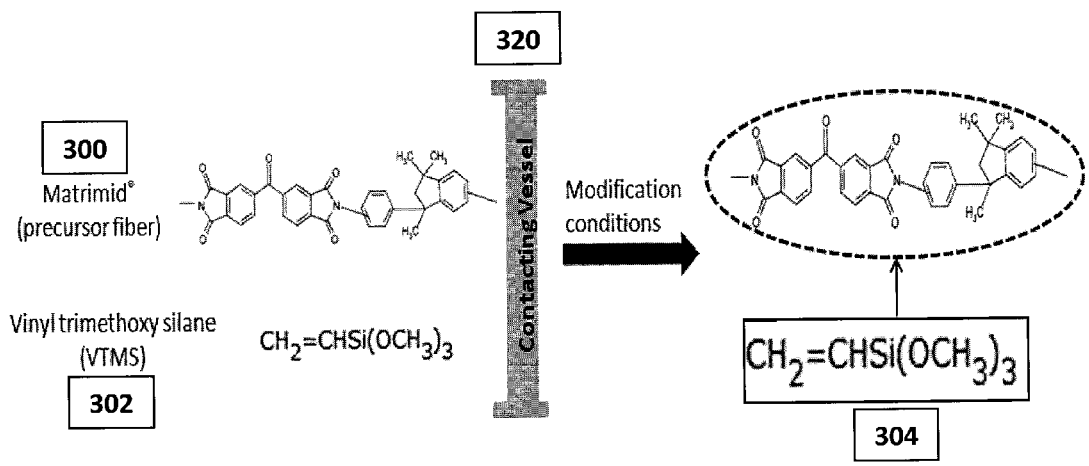
FIG. 9 is an illustration of an exemplary CMS precursor fiber thermal stabilization process according to various embodiments of the present invention.

FIG. 9 is an illustration of an exemplary process according to various embodiments of the present invention. Precursor fiber 300 is added to a modifying agent 302, such as VTMS, in contacting device 320. Precursor fiber 300 can be various conventional asymmetric hollow fibers suitable for use, including, but not limited to, Matrimid® and 6FDA:BPDA-DAM. For VTMS modification on Matrimid® precursor, precursor fibers 300 can be simply immersed in excess of VTMS liquid 302 in a sealed contacting device 320 without any additional chemical. Contacting device 320 can be maintained at room temperature or can be heated in a heated convection oven (~200° C.) for about 30 minutes to allow for the modification process. If heated, after the reaction, reaction tube 320 is cooled down and fibers 304 are removed from the liquid 302. Fibers 304 are then placed at 150° C. under vacuum for 6 hours to remove excess modification agent 302.

Without being bound to any specific theory of operation, it is believed that the VTMS modifies the precursor prior to thermal decomposition of the main polymer precursor to form carbon. It should be noted that the present invention is not limited to precursor fibers having aromatic rings. It should be noted that various other precursor fibers having aromatic rings may also be suitable, and are thus, considered to be within the scope of the present invention.

For example, and not by way of limitation, various embodiments of the present invention can use polyimide precursor molecule 6FDA:BPDA-DAM. As discussed prior, a purpose of modifying silane molecules on precursors is to give the stability to the polymer chains during the heat treatment above $T_g$. When using unmodified 6FDA:BPDA-DAM, the membrane collapse can be smaller than other fibers, such as unmodified Matrimid®, because of various differences between the structures. For example, 6FDA:BPDA-DAM has a higher glass transition temperature of than Matrimid®. Also, bulkier-$CF_3$ groups of 6FDA:BPDA-DAM leaves the molecule during pyrolysis. Other polyimides made from the 6FDA dianhydride monomer are expected to act similar to 6FDA:BPDA-DAM when used as precursors and treated with a modifying agent such as VTMS.

EXPERIMENTAL METHOD

Materials

The glassy polymers used in the study were Matrimid® 5218 and 6FDA:BPDA-DAM. The polymers were obtained from the sources, Matrimid® 5218 from Huntsman International LLC and 6FDA:BPDA-DAM was lab-custom synthesized from Akron Polymer Systems (APS). The vinyl trimethoxy silane was obtained from Sigma-Aldrich. To obtain the above mentioned polymers one can also use other available sources or synthesize them. For example, such a polymer is described in U.S. Pat. No. 5,234,471, the contents of which are hereby incorporated by reference.

Formation of Polymer Precursor Hollow Fiber Membranes

Figure 4A:
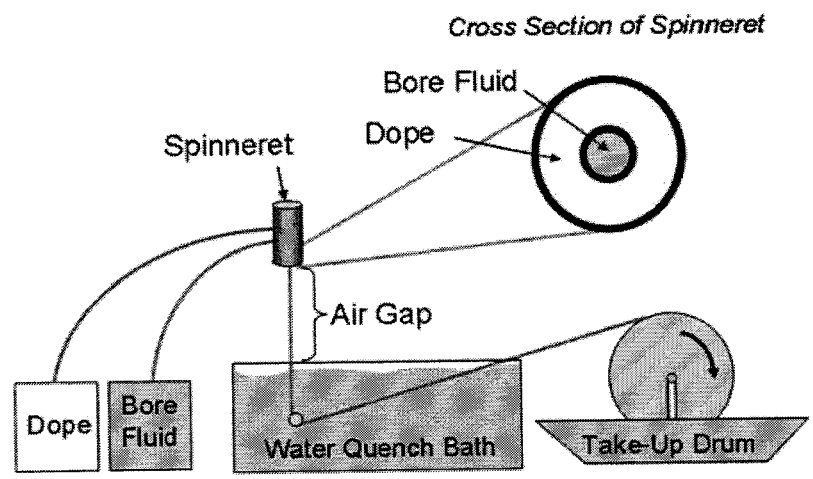
FIG. 4a is an illustration of a conventional dry-jet/wet-quench spinning process for producing asymmetric hollow fiber membranes.
Figure 4B:
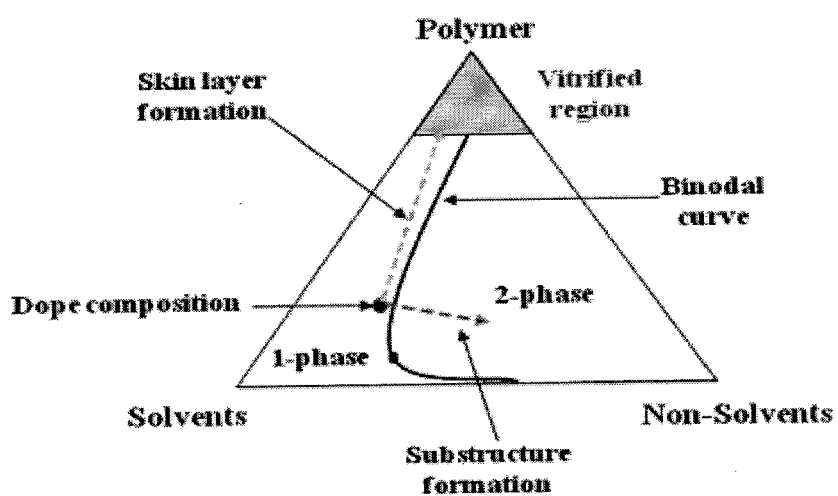
Figure 5A:
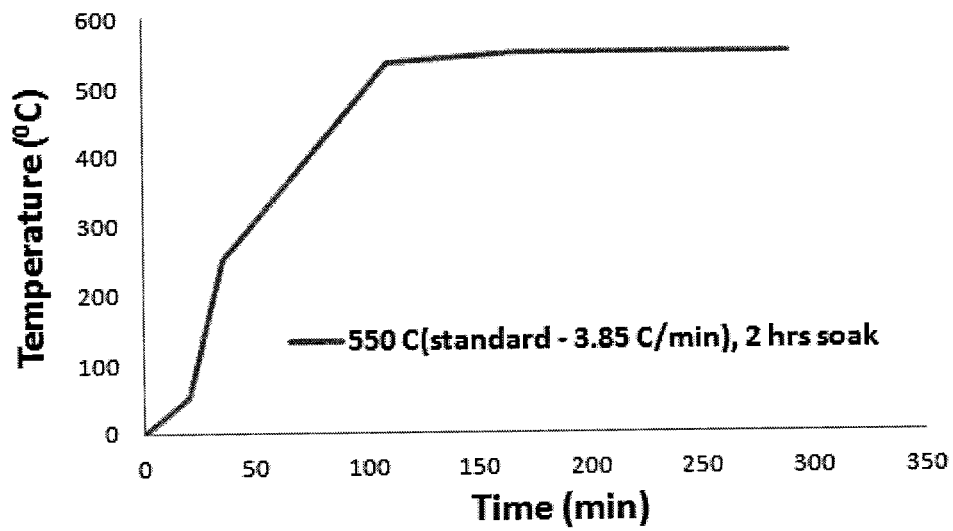
FIG. 5a illustrates the pyrolysis temperature protocol used for the formation of conventional CMS hollow fibers.
Figure 5B:
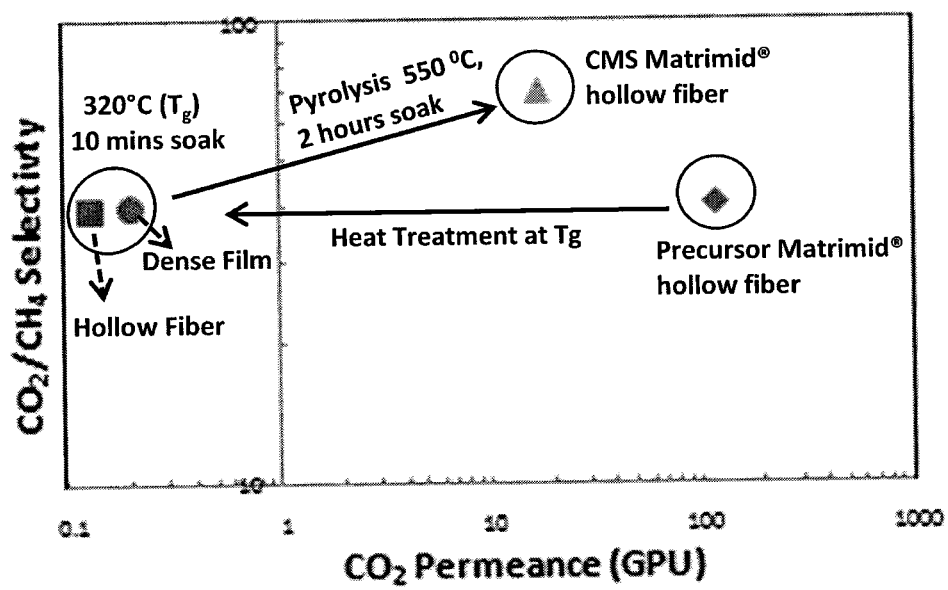
FIG. 5b illustrates the permeance drop experienced in CMS hollow fiber membranes from Matrimid® precursor due to the substructure collapse occurring at $T_g$.
Figure 6A:
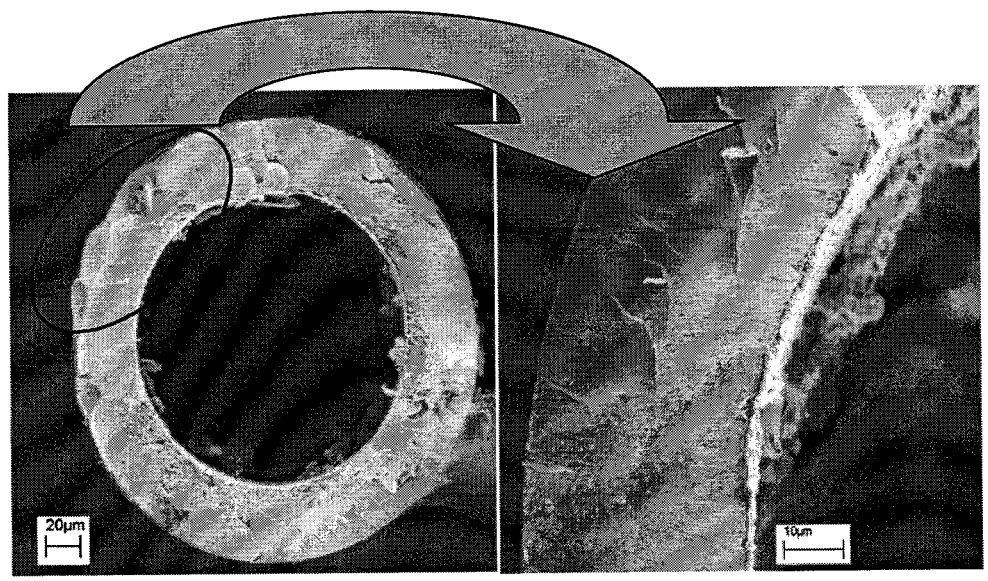
FIGS. 6a and 6b are SEM images of fiber after the heat treatment at $T_g$ depicting the collapse morphology (6a) and skin morphology of a precursor fiber before the heat treatment (6b).
Figure 6B:
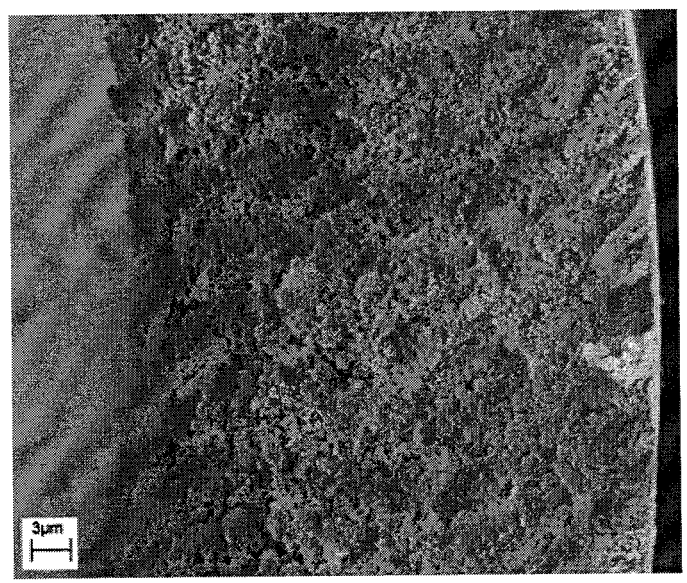
Figure 7:
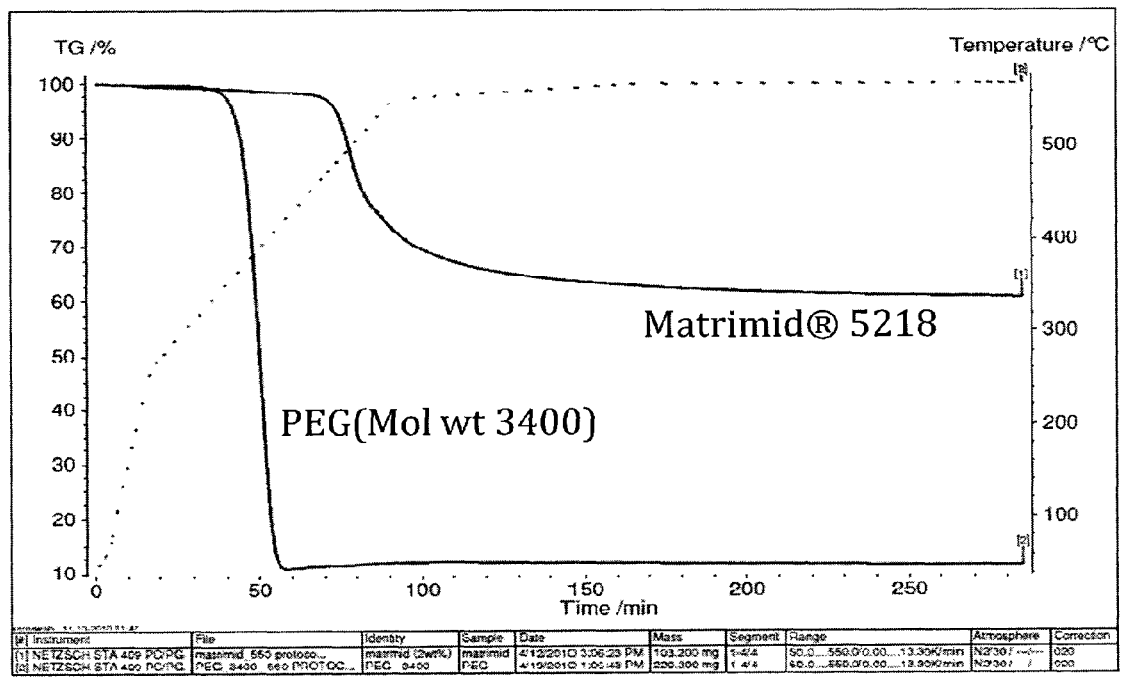
FIG. 7 illustrates a comparison of both the TGA curves for Matrimid® and PEG (Mol wt: 3400).
Figure 8A:
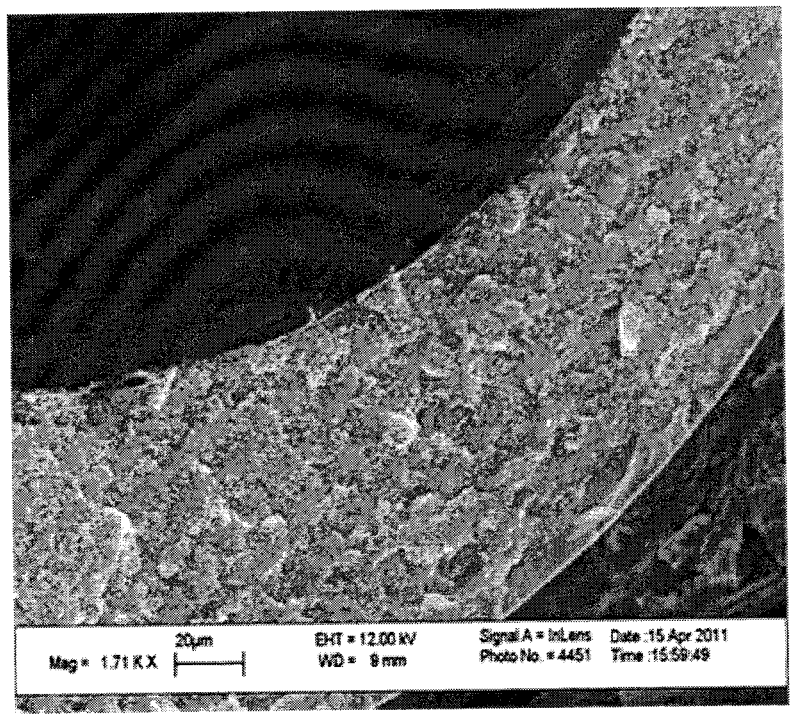
FIGS. 8a and 8b are SEM images of the diamine-crosslinked Matrimid® precursor fiber membrane (8a) and resultant CMS fiber membrane still indicating the collapse (8b).
Figure 8B:
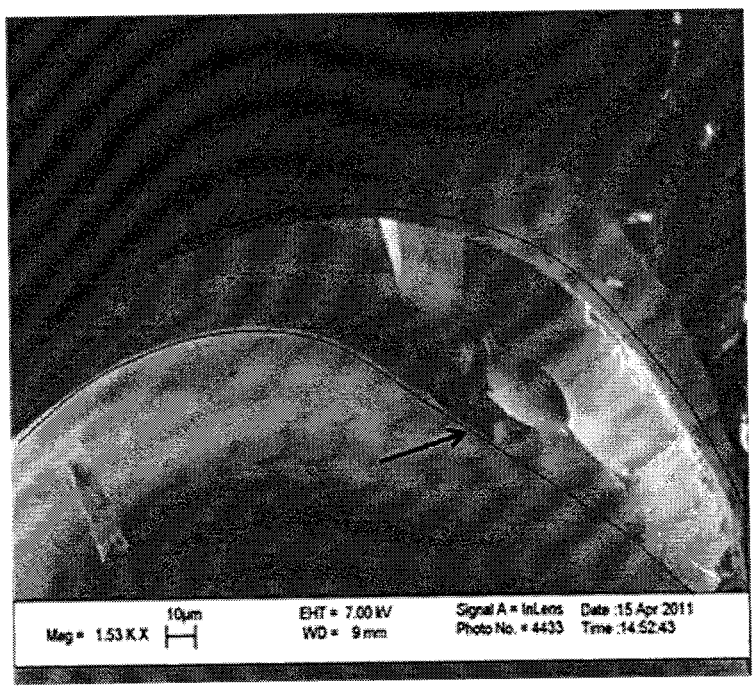

Asymmetric hollow fiber membranes comprise an ultra-thin dense skin layer supported by a porous substructure. In the examples used for illustration purposes, asymmetric hollow fiber membranes are formed via a conventional dry-jet/wet quench spinning process, illustrated by way of example in FIG. 4a. The present invention is not limited to any particular method or process for forming the polymer precursor. The polymer solution used for spinning is referred to as "dope". Dope composition can be described in terms of a ternary phase diagram as shown in FIG. 4b. The formation of defect-free asymmetric hollow fibers was followed from the process described in U.S. Pat. No. 4,902,422 the contents of which are hereby incorporated by reference.

Pre-Treatment of Polymer Precursor Fibers

For VTMS modification on a Matrimid® precursor, the fibers are immersed in excess of VTMS liquid in a closed contacting vessel, as illustrated by way of example in FIG. 9. The modification was performed by soaking the fibers in VTMS for 24 hours at room temperature (25° C.) which gave similar observations as shown in the examples discussed later.

In a second embodiment, the VTMS was contacted with Matrimid® precursor in a closed cell and heated in a convection oven to 200° C. for 30 minutes. After the heating, the cell was cooled down to room temperature (~25° C.) and the fibers removed from the liquid. The fibers were then placed at 150° C. under vacuum for 6 hours to remove the excess VTMS (boiling point of VTMS—135° C.).

Pyrolysis

Figure 10:
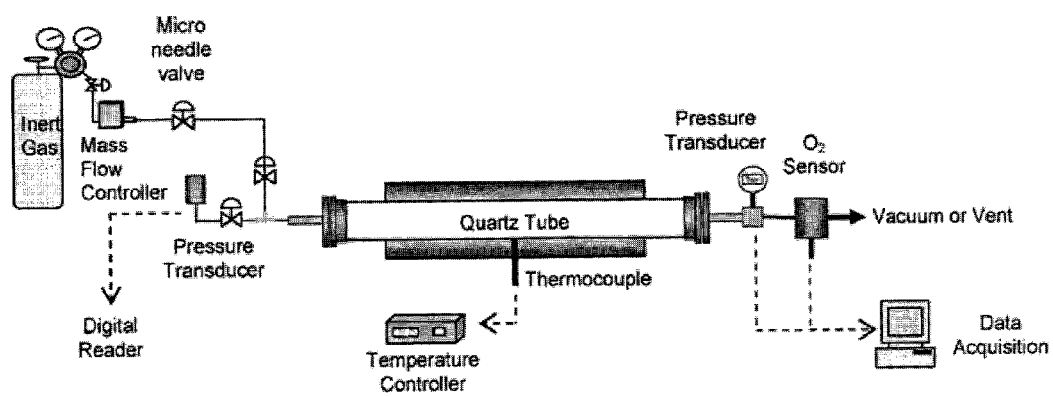
FIG. 10 is an illustration of an exemplary pyrolysis process than can be used with various embodiments of the present invention.

The polymer fibers were placed on a stainless steel wire mesh and held in place by wrapping a length of wire around the mesh and fibers. The mesh support was loaded to a pyrolysis setup, as illustrated in FIG. 10. For each polyimide precursor, a different pyrolysis temperature and atmosphere were used.

Matrimid®:

Final pyrolysis temperature-650° C., temperature profile:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

Pyrolysis atmosphere: Ultra High purity Argon (~99.9%)

6FDA:BPDA/DAM:

Final pyrolysis temperature-550° C., temperature profile:
a. 50° C. to 250° C. at a ramp rate of 13.3° C./min
b. 250° C. to 535° C. at a ramp rate of 3.85° C./min
c. 535° C. to 550° C. at a ramp rate of 0.25° C./min
d. Soak for 2 hours at 550° C.

Pyrolysis atmosphere: Argon with 26.3 ppm of oxygen

The pyrolysis system used in this study is depicted in FIG. 10. A temperature controller (Omega Engineering, Inc.,) was used to heat a furnace Thermocraft®, Inc. and fiber support kept in the quartz tube (National Scientific Co.). An assembly of a metal flange with silicon O-rings (MTI Corporation) was used on both ends of a quartz tube. An oxygen analyzer (Cambridge Sensotec Ltd., Rapidox 2100 series, Cambridge, England with ±1% accuracy between $10^{-20}$ ppm and 100%) was integrated to monitor an oxygen concentration during the pyrolysis process.

CMS Membrane Testing Modules

CMS fibers were tested in a single fiber module and constructed as described in US Patent Publication No. 2002/0033096 A1 by Koros et al., the contents of which are hereby incorporated by reference. CMS fiber module were tested in a constant-volume variable pressure permeation system for both pure and mixed gas feeds similar to the one described in US Patent Publication No. 2002/0033096 A1 by Koros et al.

Experimental Results Review

Example 1

CMS membranes from Matrimid® precursor where prepared as described in the experimental section above. The validation for the example is shown below:

SEM Images of the CMS Fiber Membranes from the VTMS Modified Precursor

Figure 11A:
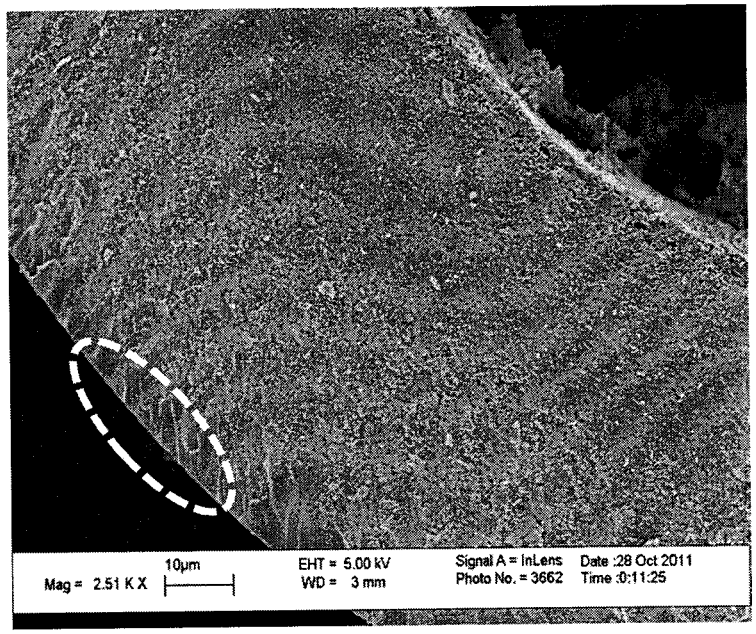
FIGS. 11a and 11b are SEM images showing improved substructure morphology for Matrimid®.
Figure 11B:
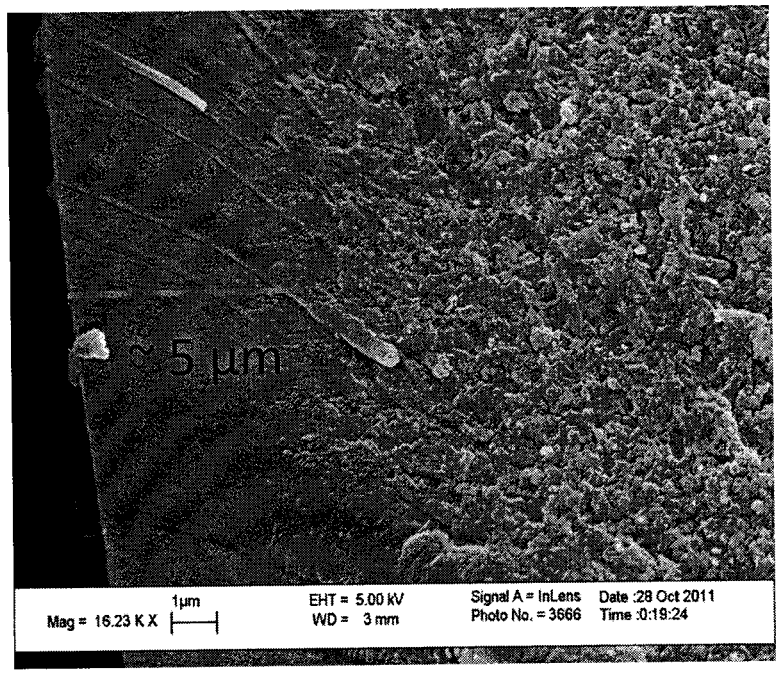

CMS membranes from Matrimid® modified precursors shows an improved morphology under SEM. FIGS. 11a and 11b are SEM images showing improved substructure morphology for Matrimid®.

Transport Properties for CMS from Modified Precursors

CMS—VTMS Modified Matrimid®:

The CMS module was tested using pure $CO_2$ and pure $CH_4$ at 100 psig with an evacuated permeate. The permeance of the pretreated CMS increased by ~4× over the untreated CMS with almost no change in selectivity, as shown in TABLE 1.

TABLE 1

Comparison of the CMS from modified and unmodified Matrimid ® precursors pyrolyzed at 650° C. for pure gas feed.

| | $CO_2$ PERMEANCE (GPU) | SELECTIVITY ($CO_2/CH_4$) |
|---|---|---|
| CMS With VTMS Modified Precursor | 38 | 92 |
| CMS With Unmodified Precursor | 10 | 88 |

Example 2

CMS membranes from 6FDA:BPDA-DAM precursor where prepared as described in the experimental section above. The validation for the example is shown below:

SEM Images of the CMS Fiber Membranes from the VTMS Modified Precursor

Figure 12A:
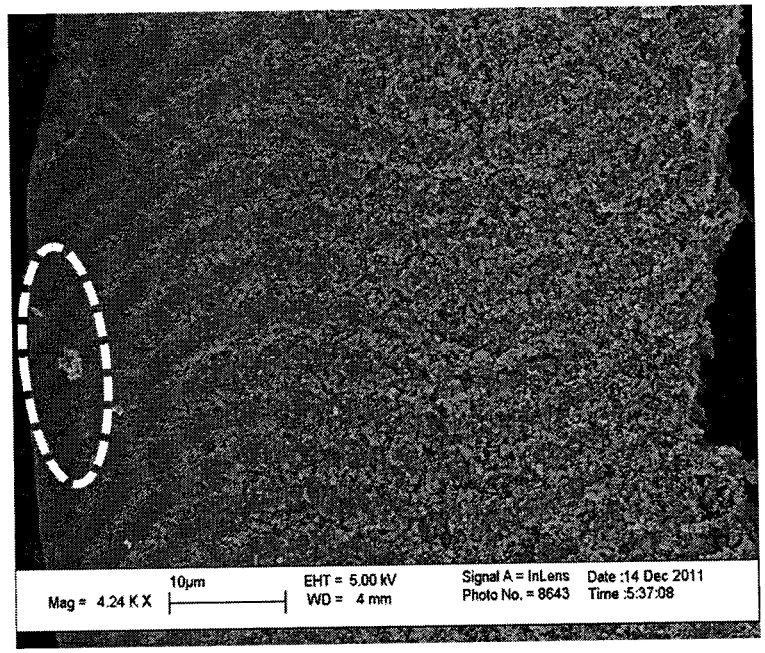
FIGS. 12a and 12b are SEM images showing improved substructure morphology for 6FDA:BPDA-DAM.
Figure 12B:
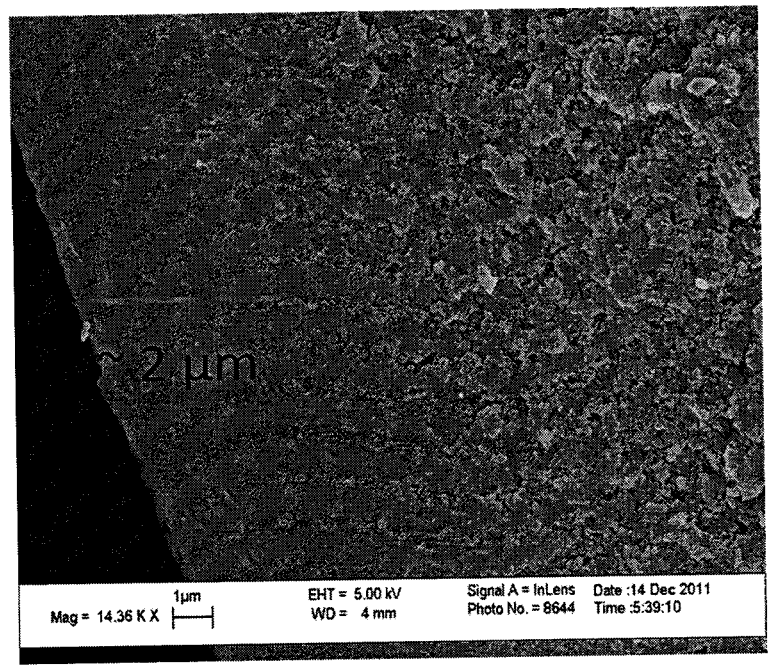

CMS membrane from 6FDA:BPDA-DAM modified precursors show an improved morphology under SEM. FIGS. 12a and 12b are SEM images showing improved substructure morphology for 6FDA:BPDA-DAM.

Transport Properties for CMS from Modified Precursors
CMS VTMS Modified 6FDA:BPDA-DAM:

The CMS VTMS modified 6FDA module is tested for both pure gas and mixed gas (50% $CO_2$-50% $CH_4$) streams. Comparison of separation performance for pure gas feed with the unmodified CMS performance values are shown in TABLE 2.

TABLE 2

Comparison of the CMS from modified and unmodified 6FDA:BPDA-DAM precursors pyrolyzed at 550° C. for pure gas feed.

| | $CO_2$ PERMEANCE (GPU) | SELECTIVITY ($CO_2/CH_4$) |
|---|---|---|
| CMS With VTMS Modified Precursor | 245 | 51 |
| CMS With Unmodified Precursor | 53 | 48 |

In the case of 6FDA:BPDA-DAM, the permeance enhancement is similar to what was shown for Matrimid® (~5×).

Figure 13A:
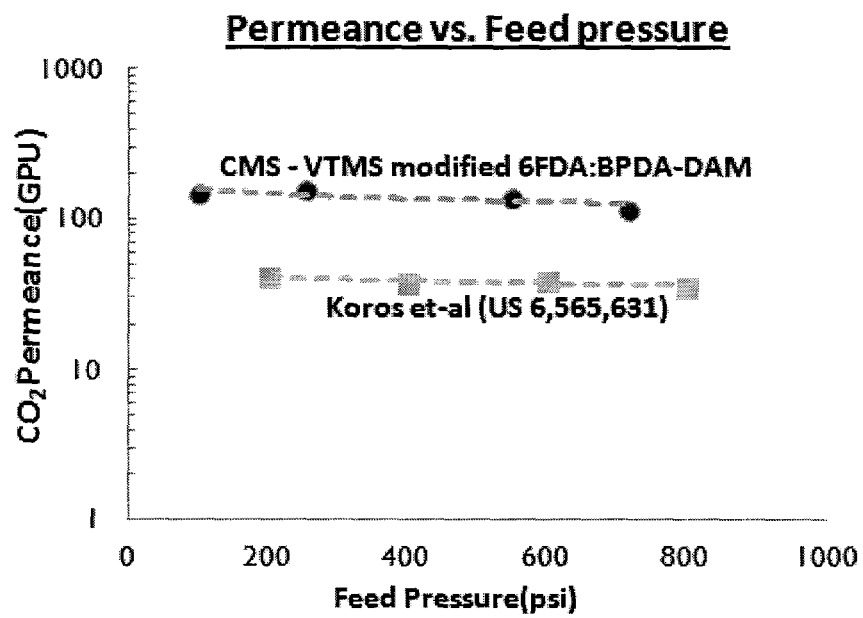
FIGS. 13a and 13b show test results for CMS fibers made according to various embodiments of the present invention compared to CMS fibers made according to conventional techniques.
Figure 13B:
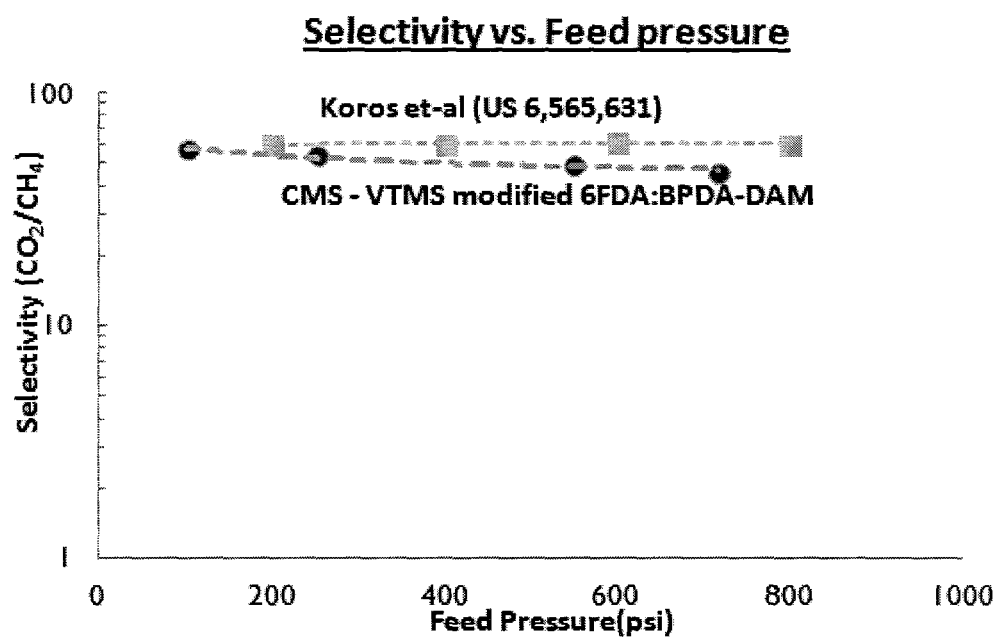

In order to test the stability of the CMS VTMS modified 6FDA fibers, the CMS module was tested for mixed gas up to 800 psia and compared with the performance of CMS 6FDA:BPDA-DAM fibers made according to various methods as taught by Koros et al. in U.S. Pat. No. 6,565,631. FIGS. 13a and 13b show comparisons of the performance of the VTMS treated CMS of this embodiment and the fibers produced by the method taught in U.S. Pat. No. 6,565,631. The CMS fibers of this embodiment have ~2× the permeance of the fibers from U.S. Pat. No. 6,565,631 while maintaining a similar selectivity.

Example 3

Anti-Stick Property for VTMS Modified Precursor Fibers

By using various embodiments of the present invention, the amount of sticking between fibers can be reduced or eliminated while maintaining the good separation performance. A control run with the unmodified Matrimid® precursor fibers was performed where multiple fibers were bundled close to one another during the pyrolysis, shown in FIG. 14a. After the pyrolysis the CMS unmodified fibers were stuck to one another and impossible to separate the fibers without causing serious damage or breakage. The same experiment was performed on Matrimid® precursors modified according to various embodiments of the present invention, as shown in FIG. 14b. After pyrolysis these CMS VTMS modified fibers do not stick together and achieve an "anti-stick" property.

In addition to the "anti-stick" property, it can also be desirable that CMS fibers have good separation performance. The permeance of bundled fibers was compared to both non-bundled untreated fibers, and bundled non-treated fibers shown in TABLE 3. The untreated fibers were not testable because they were stuck together.

TABLE 3

Comparison of the permeance of bundled fibers with both non-bundled, treated fibers and bundled, non-treated fibers. (Testing conditions: 35° C. and 100 psia pure gas).

Figure 14A:
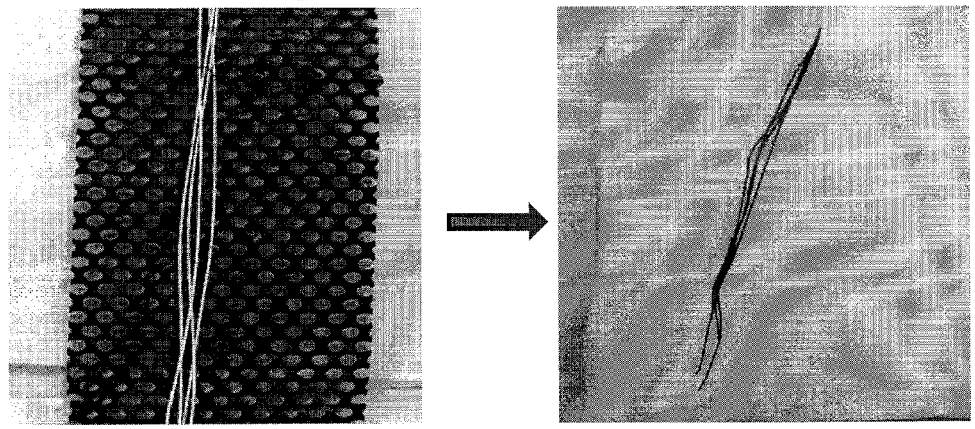
FIG. 14a shows conventional CMS fibers adhered to one another.
Figure 14B:
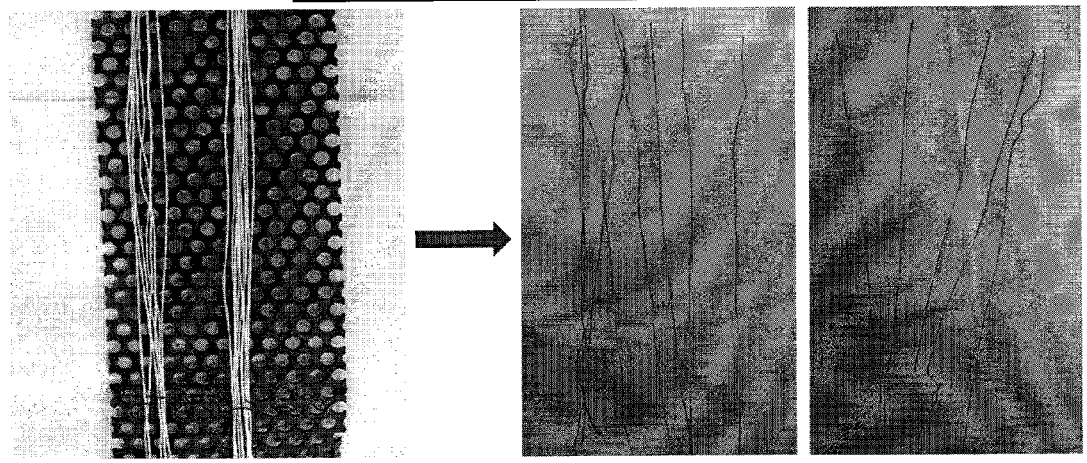
FIG. 14b shows CMS fibers made according to various embodiments of the present invention not adhering appreciably to each other.

| STATE DURING PYROLYSIS | $CO_2$ PERMEANCE (GPU) | $CO_2/CH_4$ SELECTIVITY |
|---|---|---|
| CMS With VTMS Modified Precursor (Non-Bundled) | 33 | 106 |
| CMS With VTMS Modified Precursor (Bundled) - FIG. 14(b) | 25 | 117 |
| CMS With Unmodified Precursor (Bundled) - FIG. 14(a) | Not Possible To Test Due To Damage In Fibers | |

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

We claim:

1. A process for forming a carbon membrane using precursor pre-treatment comprising:
   providing a polymer precursor;
   pre-treating at least a portion of the polymer precursor with an agent that is capable of reducing substructure collapse; and
   subjecting the pre-treated polymer precursor to pyrolysis;
   wherein the step of pre-treating at least a portion of the polymer precursor provides at least a 300% increase in the $CO_2$ permeance of the carbon membrane in contrast to the carbon membrane without precursor pre-treatment.

2. The process of claim 1, wherein the step of pre-treating at least a portion of the polymer precursor provides at least a 400% increase in the $CO_2$ permeance of the carbon membrane in contrast to the carbon membrane without precursor pre-treating.

3. The process of claim 1, wherein the step of pre-treating at least a portion of the polymer precursor provides an increase in the gas separation selectivity of the carbon membrane in contrast to the carbon membrane without precursor pre-treatment.

4. The process of claim 3, wherein the gas separation selectivity comprises $CO_2/CH_4$ separation selectivity.

5. The process of claim 1, wherein the polymer precursor comprises a soluble thermoplastic polyimide.

6. The process of claim 1, wherein pre-treating at least a portion of the polymer precursor comprises chemically modifying the polymer precursor.

7. The process of claim 1, wherein the polymer precursor comprises an asymmetric hollow polymer fiber.

8. The process of claim 1, wherein the polymer precursor comprises an aromatic imide polymer precursor.

9. The process of claim 1, wherein the carbon membrane that is subject to the precursor pre-treatment has a similar selectivity to the carbon membrane without precursor pre-treatment.

10. A process for forming a carbon membrane by modifying at least a portion of the polymer precursor comprising:
providing a polymer precursor;
providing a modifying agent, the modifying agent comprising a silane having the formula $R^1R^2R^3R^4Si$, where each of $R^1$, $R^2$, $R^3$, and $R^4$ is independently vinyl, $C_1$-$C_6$ alkyl, —O-alkyl, or halide, with the proviso that the silane contain at least one vinyl group and at least one —O-alkyl or halide;
contacting at least a portion of the modifying agent with the polymer precursor to provide for the modification of at least a portion of the polymer precursor; and
subjecting the modified polymer precursor to pyrolysis to form the carbon membrane;
wherein the modification of at least a portion of the polymer precursor increases the gas permeance of the carbon membrane relative to a carbon membrane formed from the polymer precursor which is not contacted with the modifying agent.

11. The process of claim 10, wherein the carbon membrane comprises a hollow fiber membrane.

12. The process of claim 11, wherein the hollow fiber membrane comprises an asymmetric membrane.

13. The process of claim 10, wherein the carbon membrane comprises a substantially non-collapsed, asymmetric hollow fiber membrane.

14. The process of claim 10, wherein the modifying agent is vinyl trimethoxy silane or vinyl triethoxy silane.

15. The process of claim 10 further comprising providing an initiator when contacting at least a portion of the modifying agent with the polymer precursor.

16. The process of claim 10, wherein the polymer precursor is an aromatic imide polymer.

17. The process of claim 10, wherein the polymer precursor is a composite structure comprising a first polymer supported on a porous second polymer.

18. The process of claim 12, wherein the asymmetric hollow fiber membrane comprises a group of membrane fibers that are in contact with one another during the pyrolysis process and do not adhere to one another after pyrolysis.

19. The process of claim 10, wherein the carbon membrane formed from a polymer precursor that is contacted with the modifying agent has a selectivity similar to that of a carbon membrane formed from the same polymer precursor which is not contacted with the modifying agent.

20. A process for making a carbon membrane comprising:
providing a polymer precursor comprising a soluble thermoplastic polyimide;
chemically modifying the polymer precursor with a modifying agent; and
heating the chemically modified precursor to at least a temperature at which pyrolysis byproducts are evolved;
wherein the carbon membrane has a $CO_2$ permeance (GPU) of greater than 35 and a $CO_2/CH_4$ selectivity greater than 88 in 100 psia in pure $CO_2$ and $CH_4$ gas streams at 35° C.

21. The process of claim 20, wherein the modifying agent comprises vinyl trimethoxy silane or vinyl triethoxy silane.

22. A process for making a carbon membrane comprising:
providing a polymer precursor comprising a soluble thermoplastic polyimide;
chemically modifying the polymer precursor with a modifying agent; and
heating the chemically modified precursor to at least a temperature at which pyrolysis byproducts are evolved;
wherein the carbon membrane has a $CO_2$ permeance (GPU) of greater than 53 and a $CO_2/CH_4$ selectivity greater than 48 in 100 psia in pure $CO_2$ and $CH_4$ gas streams at 35° C.

23. The process of claim 22, wherein the modifying agent comprises vinyl trimethoxy silane.

24. A process for forming a carbon membrane by modifying at least a portion of the polymer precursor comprising:
providing an aromatic imide polymer precursor;
providing a modifying agent;
contacting at least a portion of the modifying agent with the polymer precursor to provide for the modification of at least a portion of the polymer precursor; and
subjecting the modified polymer precursor to pyrolysis to form the carbon membrane;
wherein the modification of at least a portion of the polymer precursor increases the gas permeance of the carbon membrane relative to a carbon membrane formed from the polymer precursor which is not contacted with the modifying agent.

25. A process for forming a carbon membrane by modifying at least a portion of the polymer precursor comprising:
providing a polymer precursor;
providing a modifying agent;
contacting at least a portion of the modifying agent with the polymer precursor to provide for the modification of at least a portion of the polymer precursor; and
subjecting the modified polymer precursor to pyrolysis to form the carbon membrane;
wherein the modification of at least a portion of the polymer precursor increases the gas permeance of the carbon membrane relative to a carbon membrane formed from the polymer precursor which is not contacted with the modifying agent; and
wherein the carbon membrane comprises an asymmetric hollow fiber membrane, the asymmetric hollow fiber membrane comprising a group of fibers that are in contact with one another during the pyrolysis process and do not adhere to one another after pyrolysis.

26. A process for forming a carbon membrane using precursor pre-treatment comprising:
providing a polymer precursor;
pre-treating at least a portion of the polymer precursor with an agent that is capable of reducing substructure collapse; and
subjecting the pre-treated polymer precursor to pyrolysis;
wherein the step of pre-treating at least a portion of the polymer precursor provides at least a 300% increase in the gas permeance of the carbon membrane in contrast to the carbon membrane without precursor pre-treatment; and
wherein pre-treating at least a portion of the polymer precursor comprises chemically modifying the polymer precursor.

27. The process of claim 26, wherein the step of pre-treating at least a portion of the polymer precursor provides at least a 400% increase in the gas permeance of the carbon membrane in contrast to the carbon membrane without precursor pre-treating.

28. The process of claim 26, wherein the polymer precursor comprises an asymmetric hollow polymer fiber.

29. The process of claim 26, wherein the polymer precursor comprises an aromatic imide polymer precursor.

30. The process of claim 26, wherein the step of pre-treating at least a portion of the polymer precursor provides an increase in the gas separation selectivity of the carbon membrane in contrast to the carbon membrane without precursor pre-treatment.

31. The process of claim 26, wherein the carbon membrane that is subject to the precursor pre-treatment has a similar selectivity to the carbon membrane without precursor pre-treatment.

* * * * *